May 25, 1948. R. H. HAUNGS 2,442,238
ELECTRONIC CYCLING CIRCUITS
Filed Aug. 11, 1944 4 Sheets-Sheet 1
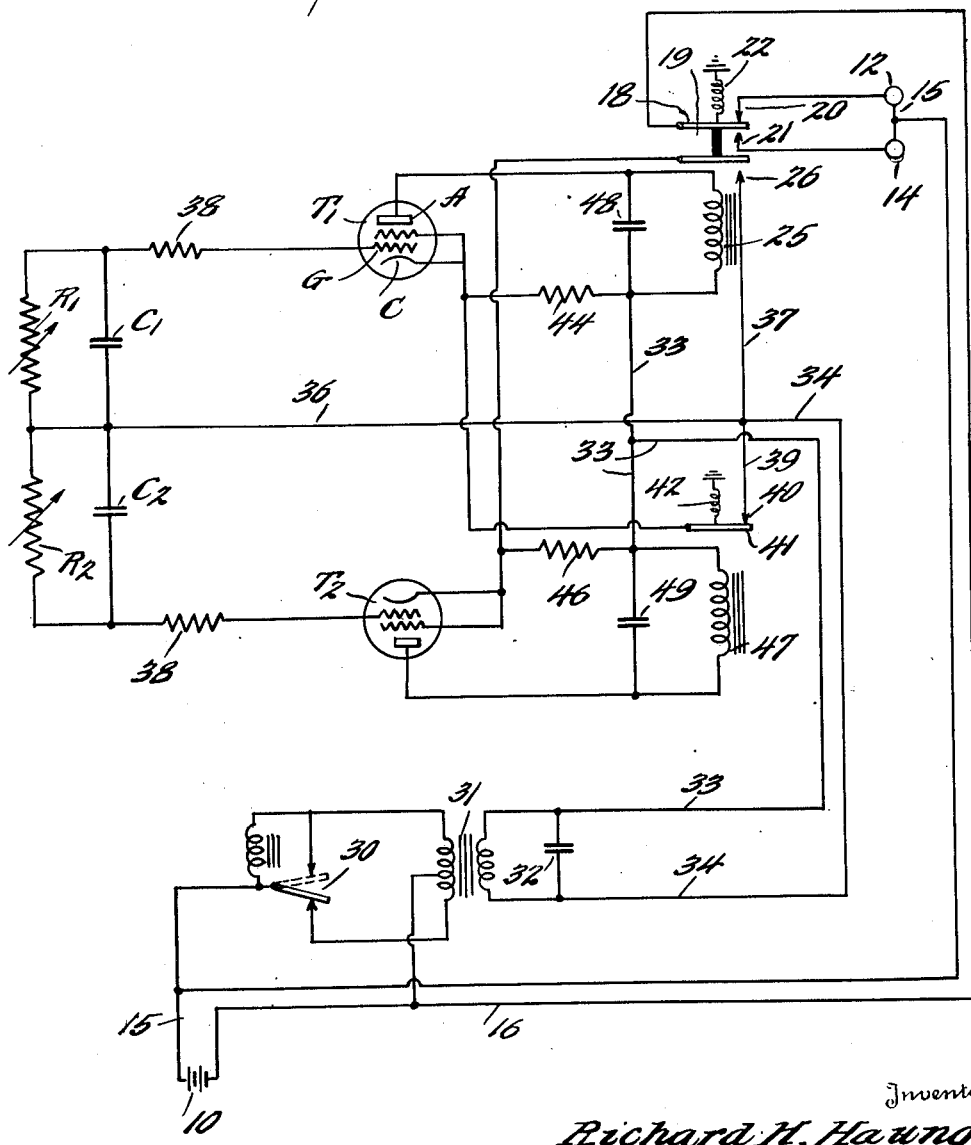
Inventor
Richard H. Haungs
By Leech & Radue
Attorney

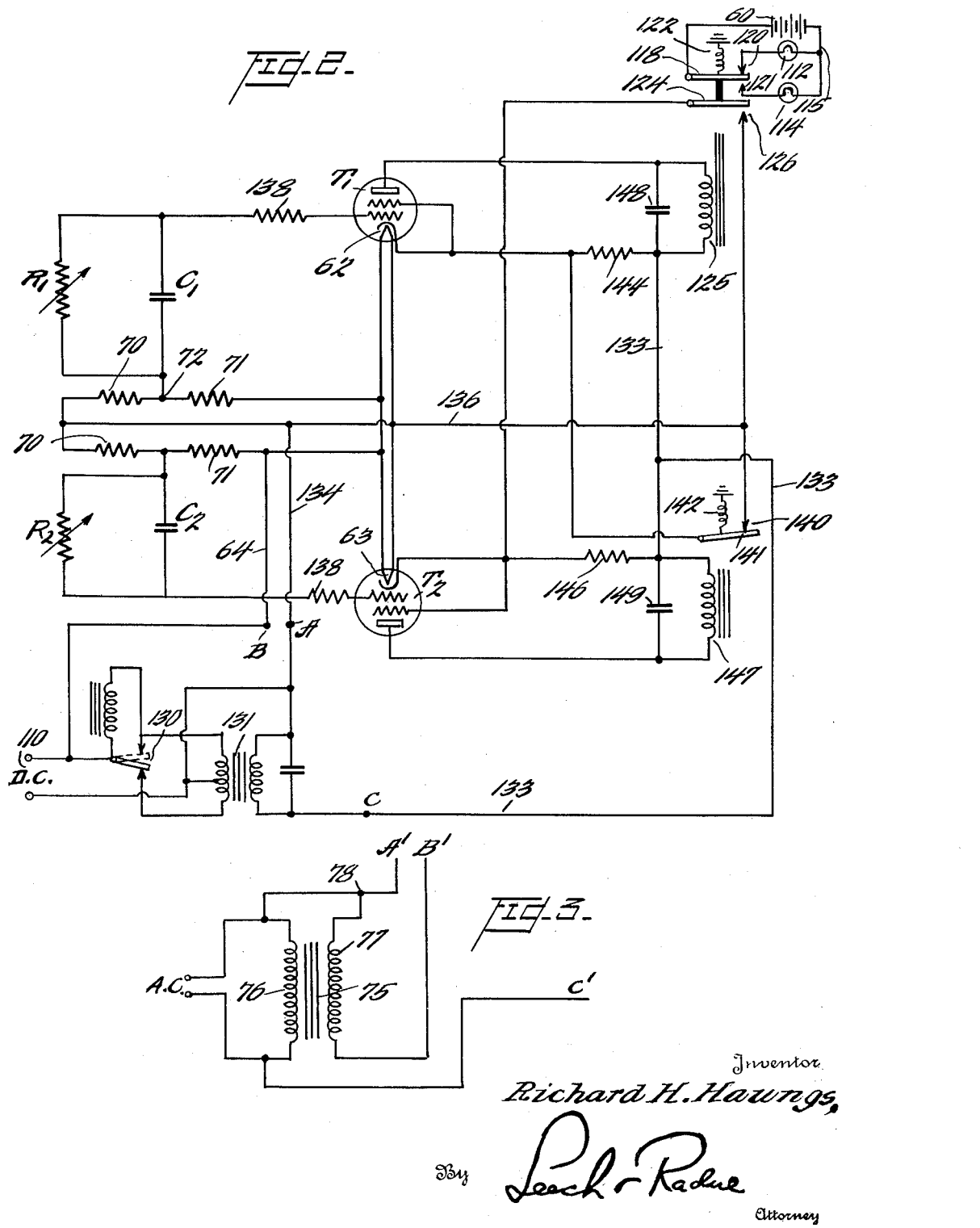

Inventor
Richard H. Haungs,
By Leech - Radue
Attorney

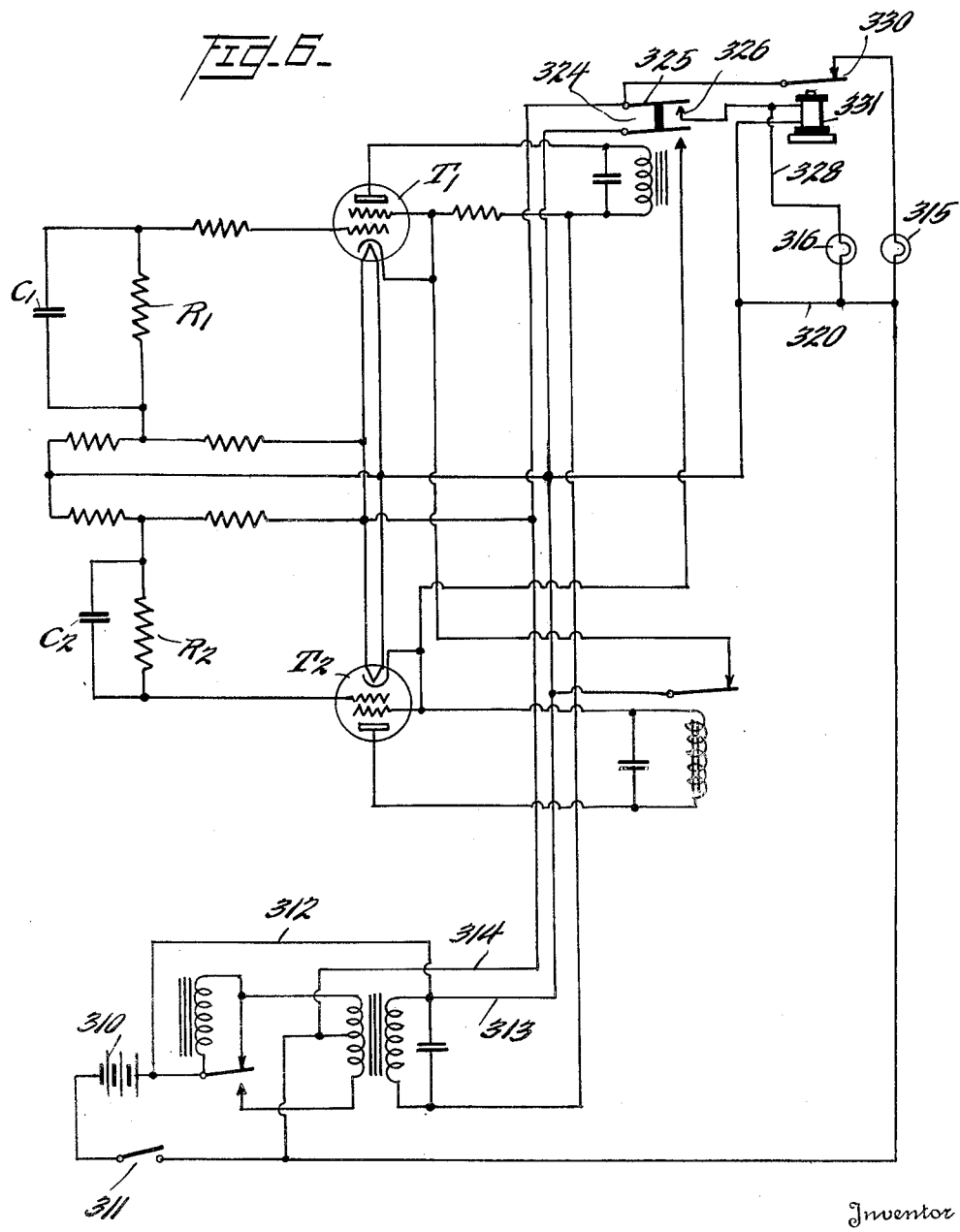

Patented May 25, 1948

2,442,238

UNITED STATES PATENT OFFICE 2,442,238

ELECTRONIC CYCLING CIRCUITS

Richard H. Haungs, Lancaster, N. Y.

Application August 11, 1944, Serial No. 549,100

13 Claims. (Cl. 175—320)

1

This invention relates to electronic circuits and more particularly to circuits making use of electron tubes for controlling time intervals.

It is a general object of the present invention to provide novel and improved electronic timing or cycling circuits.

More particularly it is an object of the invention to provide cycling circuits using electronic tubes in which the control of these tubes is effected in accordance with the time of discharge of a condenser which preferably controls the grid bias of one or more tubes.

An important feature of the invention comprises the use of thyratron type tubes; in which the anode to cathode resistance is such as to prevent the flow of current until the negative potential on the grid is reduced to a point where ionization commences after which the grid loses control and the tube conducts until current is shut off in the anode circuit; and determining the time of "firing" or beginning of conductivity by regulating the grid bias potential by the discharge of a condenser which has previously been charged to a fixed potential. The time of discharge between the fixed charge potential and that potential to which the grid must be reduced to permit firing is fixed by the discharge rate of the condenser through a resistor and can be adjusted by varying the condenser capacity or the resistor size.

Another important feature of the invention resides in the use of a thyratron type tube as a rectifier operating between the control grid and cathode for charging the timing condenser and then using the rate of discharge of the charged condenser to control the bias potential on the control grid to determine the period of firing the tube between the anode and cathode.

A further important feature of the invention resides in the use of a plurality of timing condenser controlled thyratron tubes arranged in a circuit whereby their controlled time intervals are interconnected and interrelated so that the firing of one tube produces the charging of the condenser of another and vice versa.

Other and further objects and features of the invention will be more apparent to those skilled in the art upon a consideration of the accompanying drawings and following specification wherein are disclosed several exemplary embodiments of the invention with the understanding that such combinations thereof and changes therein may be made as fall within the scope of the appended claims without departing from the spirit of the invention.

2

In said drawings:

Figure 1 is a schematic wiring diagram of a flasher in accordance with the preferred form of the invention in which cold cathode electronic tubes are used;

Figure 2 is a view similar to Figure 1 but illustrating an embodiment using tubes having heater type cathodes where the system is energized from low voltage direct current;

Figure 3 is a fragmentary view illustrating apparatus to be substituted for the vibrator mechanism of Figure 2 when high voltage alternating current is available;

Figure 6 is a view similar to Fig. 2 illustrating an additional delay feature.

Figure 4:
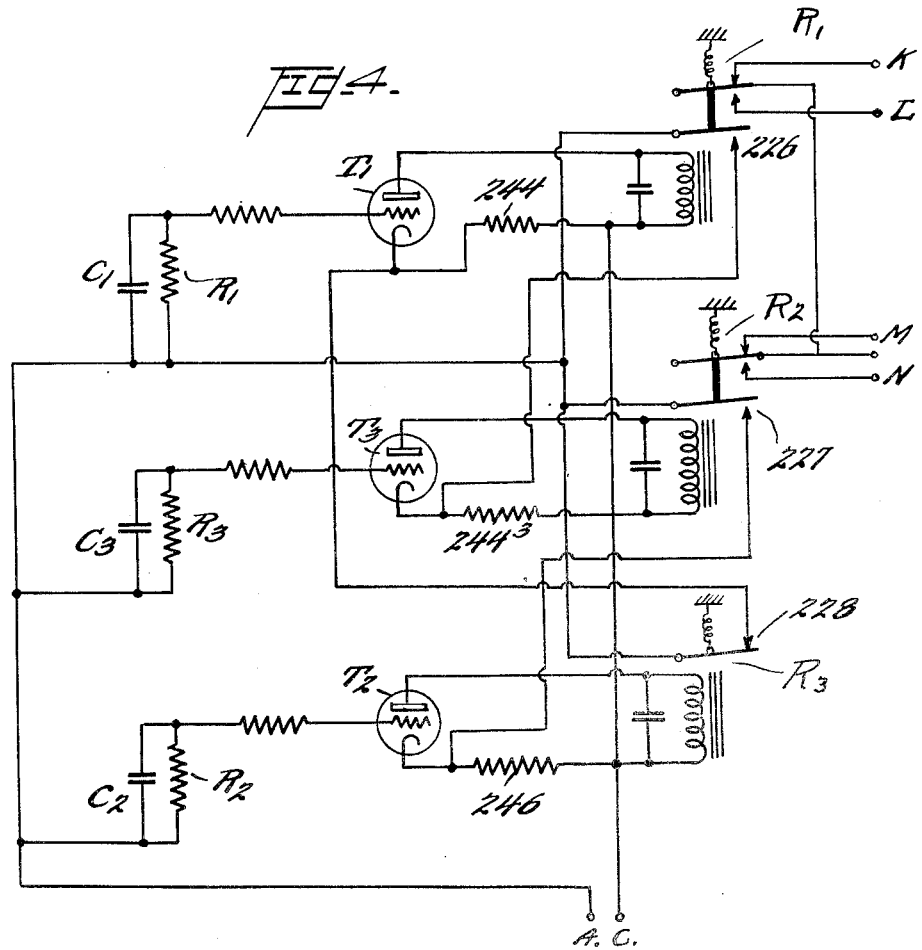
Figure 4 is a view similar to Figure 1 in which additional elements have been incorporated to provide a wider variation in switching possibilities and the timing of more than two alternative sets of lamps.

The determination of relatively short cyclic time intervals for various industrial processes, the flashing of traffic signals, sign lights and for other general usage, has been largely dependent on mechanical type interval contactors driven by synchronous motors, governed direct current motors or spring driven clock work systems. Such power sources operated various type of contacts either by cams, cranks or the like. They are capable of reasonably satisfactory operation where the time interval is relatively long but are subject to criticism where weight is a factor. Furthermore, they are not satisfactory where time intervals of short duration are required and may require a current supply not always available.

In accordance with the present invention it is proposed to provide an electronic cycling timer capable of closing one or a plurality of circuits in selected sequences and with adjustable time intervals. Such a timer can be constructed to weigh only a small fraction of the weight of an electric motor driven timer and can be made to operate with the same degree of accuracy of timing and with a simplicity of construction and ruggedness which cannot be approached by other devices.

The instruments of the present invention have been illustrated primarily, and for the sake of convenience, will be described in connection with the flashing of airplane operating lights. In accordance with a ruling of the Civil Aeronautics Authority all commercial planes must be equipped with what may be termed "basic" or "primary" running lights comprising red and green port and starboard lights and a white tail light. To prevent these from being confused with other lights or stars they are turned off for a short interval while at the same time top and bottom white lights and a red tail light are illuminated. These "secondary" lights are illuminated alternatively with and at regular intervals between the lighting of the basic lights. Heretofore the flashing has been done by motor driven governor controlled contactors operated from the six or twelve-volt battery aboard the plane. Such devices are heavy, bulky, costly and provide a considerable drain on the batteries. The several flashing circuits disclosed herein constitute full substitutes for the motor driven flasher while providing more accurate and simpler control of timing, lighter weight and less current consumption. In compactness there is no comparison.

The simplest circuit is illustrated in Figure 1 and makes use of two cold cathode thyratron rectifier tubes T1 and T2 each of the tetrode type. Each tube includes an anode A, a control grid G, a cold cathode C and a shield grid which, for the purpose of this invention, is directly connected to the cathode and can be disregarded in the description of the circuits.

The timing of the operation or "firing" of each of the thyratrons is controlled by the discharge of a condenser through a shunted resistor for determining the potential on the control grid.

In Figure 1 a source of direct current is indicated at 10 and may comprise a low voltage storage battery. The primary or basic lights on the plane are indicated at 12 and the secondary lights at 14. They are connected together by a common conductor 15 leading directly to one side of the battery. The opposite conductor from 16 from the battery leads to one movable contact arm 18 of a dual relay 19. This arm 18 is movable between contacts 20 and 21, the first of which controls the lighting of the basic lights 12, and the second of the secondary lights 14. A light spring 22 biases the arm 18 against contact 20 to normally close the circuit to the basic lights so that they will always light if any portion of the cycling circuit becomes deranged.

A second pivoted arm 24 is connected by an insulation link for movement in unison with arm 18 and both are under control of a magnet having a winding 25. The second arm is normally disengaged from contact 26 but engages the same when the magnet 25 is energized to pull the contact arms down so that the upper one engages contact 21 for the secondary lights.

Direct current from the battery 10 is converted to alternating current for the operation of the tubes through a conventional magnetic vibrator 30 and transformer 31 which together with a buffer condenser 32 provide a source of alternating current delivered through conductors 33 and 34. The conductor 34 is arranged to deliver alternating current to the common conductor 36 connected to one side of each of timing condensers C1 and C2 each shunted by a resistance R1 and R2 respectively. Either the resistances as shown or the condensers can be made variable for adjusting the time intervals. The opposite side of each condenser is connected through an appropriate current limiting resistance 38 to the control grid of its respective thyratron.

The conductor 34 is also connected by conductor 37 to contact 26 for the lower arm of the dual relay and is likewise connected by conductor 39 to the contact 40 of a single relay normally having its movable arm 41 engaging the contact through the action of biasing spring 42. Relay arms 24 and 41 are in control respectively of placing current from conductor 34 directly on the cathodes of tubes T2 and T1. When these relays are open the respective cathodes are energized from conductor 33 through the respective cathode resistances 44 and 46 which latter are connected between the A. C. lines when their relays are closed.

The anodes of the tubes are always connected to conductor 33 through the respective windings 25 and 47 of the dual and single relays. Each relay winding is shunted by an appropriate condenser 48 and 49 to improve its operation on rectified alternating current. Each of these windings is so constructed that it will be sufficiently energized by the normal current flowing to the anode of its respective thyratron when the control grid of that tube is at any instant of sufficiently low negative potential to permit operation of the tube.

In operation, when a switch is closed to associate the battery 10 with the circuit, alternating current is immediately available in the conductors 33 and 34. Both relays are in the positions indicated due to their biasing springs. Tube T1 has its cathode directly connected by way of relay contacts 40 and 41 with conductor 34 while its anode is energized from conductor 33. There is momentarily no D. C. bias on the grid. The tendency is, therefore, to energize winding 25 and draw down the arm 18 of the dual delay but this action is not as rapid, because of the reactance of the winding 25, as is the operation of tube T2 to charge condenser C2 which takes place as follows:

The cathode of the tube T2 is associated with conductor 33 through resistor 46, while the control grid through its resistor 38 and condenser C2 is connected to conductor 34 via 36. Under these conditions the thyratron rectifies as between the cathode and the control grid to rapidly charge the series connected condenser C2, which operation takes place almost instantly, the condenser being of relatively small capacity, i. e., less than one microfarad, while the potential available from the alternating current supply may be of the order of 100 volts. The shunting resistor R2 is of the order of one or two megohms so that its leakage is insignificant during the brief charging interval. The direction of charge is such that the side of the condenser directed toward the control grid is negative. This insures a control potential on the grid when the condenser is charged which prevents the ignition or firing of the tube.

It will be remembered that tube T1 with no control potential on the grid is operating in its normal manner to rectify between the cathode and anode and in so doing energizes coil 25 which, at a short interval after the charging of condenser C2, pulls down the contacts of relay 19, causing two things to happen. The direct current is transferred from the primary lights to the secondary lights and contact arm 24 engages 26 so that, through conductor 37, current from alternating conductor 34 is led directly to the cathode of tube T2 whose anode is still energized through conductor 33 by way of winding 47. This, in effect, transfers the cathode from the anode side of the line to the control grid side. No current can flow from anode to cathode, however, until the negative bias potential on the control grid is reduced to the proper value. This reduction takes place by slow discharge of condenser C2 through its shunting resistor R2, so that the time during which current is supplied to the secondary lights is definitely controlled by the relative sizes of the condenser and resistor associated with the control grid of tube T2.

As soon as the grid potential is reduced to the "threshold" value, tube T2 fires, winding 47 is energized, contact 41 is separated from contact 40, and conductor 34 is removed from direct connection with the cathode of T1. This provides connection for the cathode to only the anode side 33 of the A. C. line by way of resistor 44. Tube T1 is immediately quenched, de-energizing the winding 25 and permitting the dual relay contacts to move up under the action of spring 22. This immediately puts out the secondary lights and illuminates the basic lights and removes the cathode of tube T2 from its direct connection with conductor 34 and quenches the tube. The cathode now receives its energy from conductor 33 via resistance 46. This instantly de-energizes winding 47 which has only been closed momentarily.

During the short interval during which relay contacts 40 and 41 are separated under the action of winding 47, thyratron T1 charges condenser C1 through its cathode-control grid rectification process as described in connection with tube T2. Therefore, when relay contacts 40 and 41 are closed, thyratron T1 cannot fire until its condenser C1 has discharged to a sufficiently low negative potential. Therefore the relative size of condenser C1 and resistor R1 controls the time during which the circuit is closed to illuminate the primary or basic lights 12.

When its negative grid potential is sufficiently reduced, tube T1 fires and energizes winding 25 and the process is repeated. Thus cyclic operation of the two sets of lights continues as long as current is supplied and the time of operation of each set can be determined by proper sizing of the respective condensers and resistors or by adjusting them where variable ones are provided. The timing operation is exceedingly accurate and comes well within the 10% tolerance allowed.

The circuit illustrated in Figure 2, while not differing in principle from that in Figure 1, does differ in two ways from the fundamental circuit. First, it makes use of the more conventional, independently heated cathode, type of thyratron, and second, it provides for greatly increased time intervals without the necessity for a concomitant increase in grid condenser capacity. Since the circuit in general is similar to that shown in Figure 1 the like parts have received similar reference characters with 100 added, and will not be described. Means is provided to permit the use of a separate source of current such as an independent battery 60 for operating the primary lamps 112 or the secondary lamps 114, but source 110 may be utilized as in Figure 1.

Instead of cold cathodes those using independent heaters are provided. The circuit connections of the actual cathodes are the same as in Figure 1, but the heaters 62 and 63 are arranged in parallel as shown and by means of conductors 64 and 134 are connected directly to the D. C. source 110. It will be recognized that one of these conductors, 134, also carries alternating current from the secondary of transformer 131.

Because of the availability of the heater circuits with a D. C. potential of approximately six volts, means is made use of to increase the time interval available from any definite condenser capacity R1 or R2, by requiring these condensers to provide only that change in bias potential between the maximum potential to which they are charged and that reduced bias potential at which the tube fires, usually about 8 volts. It will be noted that each of the thyratrons has a pair of series connected resistors 70 and 71 shunted across the heater circuit and from the points intermediate these two pairs of resistors 72 and 72 provide for the connection of the control grids to the A. C. conductor 134. If the amount of bias between zero and the negative voltage necessary to just prevent firing of the tube is less than that available for the heaters then, by properly proportioning the resistors 70 and 71, such a bias can be applied to the grid.

The condenser C1 or C2 can then superimpose on this only the necessary additional voltage to be lost through its resistor to produce the timing operation. Under these conditions the condenser is permitted to entirely discharge before the tube fires and hence its capacity is fully used for timing and none of its capacity is required to provide the "threshold" value for the grid. This is in contrast to the construction of Figure 1 where the grid return is directed to the conductor 34 of the alternating current.

It will be seen that the potential of each grid in Figure 2 is negative of the potential of 134 by the amount of the drop in resistor 70 as compared with that in resistor 71, the two of which apportion the heater voltage between them. In common with Figure 1, grid series resistors 138 serve to limit grid current from becoming excessive during the condenser charging operation. This is a protective measure since the grid element of a tube is not constructed to carry current of the same intensity as the anode.

While most airplanes do not have available a source of alternating current yet it is possible to provide one. For this purpose and for other uses where alternating current is available the device of Figure 3 may be substituted for the direct current vibrator and transformer. To make the substitution the points marked A, B and C in Figure 2 are connected to corresponding points A', B' and C' in Figure 3. The device of Figure 3 comprises a step-down transformer 75 having a primary 76 wound for a suitable A. C. voltage from the source shown. The secondary 77 is wound to provide the proper heater voltage for the tube heaters 62 and 63 and is auto-connected to the primary at 78 to provide the grid returns with a potential more negative than the cathode. If directly heated tubes of the A. C. filament type are used in the circuit of Figures 2 and 3 the circuit will not be substantially different.

It will be appreciated that the circuits of the tubes T1 and T2 in Figures 1 and 2 are substantially alike. In other words, they are interlocked circuits for two thyratron tubes. The only difference in the two circuits is in the anode current controlled relay or switch which is biased closed for T2 and open for T1. Under these conditions tube T1 can fire over a period controlled by the condenser C2 and is quenched by the opening of the relay controlled by the firing of T2. This practically makes T2 self-quenching because as soon as T1 is caused to quench contacts 24, 26 are opened, quenching T2. The latter tube therefore conducts only momentarily.

Where more complex light systems or the timing of other circuits or devices is desired the system of Figures 1 or 2 can be amplified by the insertion between the circuits of tubes T1 and T2 of one or more circuits identical with that of T1 and including the same sort of relay biased open. This relay as well as that of tube T1 can have additional outside circuit controlling contactors. A simple system including but one additional tube circuit, wherein the parts are designated by reference characters like those of Figure 1 but with the subscript 3 shown in Figure 4. Here the circuit of tube T3 is illustrated as interposed between the circuits of the tube T1 and tube T2. In this arrangement relay R1, in the T1 circuit, has normally open, tube-controlling contacts and is biased to close the contacts for lamp circuit K. It closes contacts for lamp circuit L when its winding is energized. Relay R2 is the same as the one arranged for tube T2 in the earlier figures, is biased closed and is only momentarily opened by the firing of tube T2. Relay R3, however, is identical with R1 and may control in a like manner lamp circuits M and N.

Relay R1 has its tube controlling contact 226 directly connected to the cathode of tube T3; relay R3 has its tube controlling contact 227 directly connected to the cathode of tube T2, while the normally closed tube controlling contact 228 of relay R2 is directly connected to the cathode of tube T1. With this arrangement the operation is similar to that already described and need not be outlined in detail. It is believed sufficient to state that the time during which lamp contact K remains closed is determined by the rate of discharge of condenser C1, for lamps K are put out when tube T1 fires. The time during which lamps L remain lighted is controlled by the rate of discharge of condenser C2 since the firing of tube T2 serves to quench tube T1 and open its relay circuit. The time during which lamps M remain lighted is determined by the rate of discharge of condenser C3 while the time during which lamps N remain lighted is controlled by the joint rates of discharge of condensers C1 and C3.

Obviously by increasing the number of tube circuits and the capacities of the controlling condensers an almost limitless series of sequential timing operations for a plurality of independent circuits can be effected. Four tubes in an arrangement comprising an amplification of the circuits shown in Figure 4 can be made to properly time and cycle traffic lights using red and green lamps each of a relatively long dwell and an amber lamp having a relatively short dwell.

Figure 5:
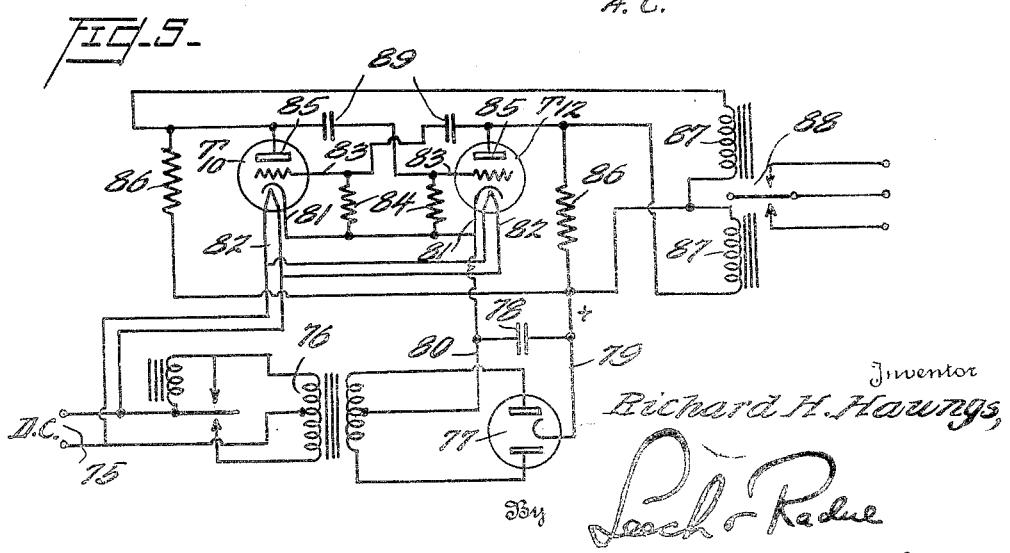
Figure 5 is a schematic wiring diagram of an alternative timing and switching system making use of relaxation oscillators.

In Figure 5 is illustrated a further embodiment of time delay or cycling circuit capable of alternately closing and holding the contacts of a dual relay so that timing operations can be given, for instance, to two sets of lights. The circuit is based on the combination of two gas-filled electron tube amplifying circuits coupled together in such a manner that oscillation occurs to alternately energize the anodes of the respective tubes each over a period determined by a time delay circuit including a condenser.

Referring now to the drawing it will be seen that the circuit of the thyratron tubes T10 and T12 requires direct current for its operation and this is achieved at an adequate high potential from, for instance, the low voltage source 75 such as may be found on any plane. This operates through a vibrator and step-up transformer 76 as described in connection with Figures 1 and 2 and the high voltage alternating current output is then applied to a conventional rectifier tube 77 for conversion into pulsating direct current which is adequately filtered for the purpose of this circuit by condenser 78. Conductor 79 provides positive potential and conductor 80 negative from the filter 78.

The tubes T10 and T12 are conventional thyratrons shown as of the separate heater type and the cathodes 81 thereof are connected together and to conductor 80 as shown. The heaters 82 are directly connected to the low voltage direct current source. The grid 83 of each tube is connected back to its cathode by a resistor 84. Each anode 85 is connected to the positive conductor 79 through a parallel circuit comprising a plate load resistor 86 and one winding 87 of the differential relay 88. Each anode is coupled to the grid of the opposite tube by means of a condenser 89.

It will be recognized that the circuit is in effect a two-stage resistance-capacitance coupled amplifier whose output is fed back to the input. The feedback connection comprises the condenser 89 and provides the requisite energy for sustaining oscillations of the two tubes, since the second of these introduces a 180° phase shift into the system. The tubes alternately fire and remain conducting until the potential of their grid is reduced to the quenching point by the discharge of condenser 89 associated therewith so that this condenser and its series connector resistor 84 determines the period of conductivity of the corresponding tube. Thus each anode transmits its potential change to the grid of the opposite tube through a time delay circuit which produces the recurring quenching actions which cause the tubes to conduct alternately to produce the self-excited oscillations which have an essentially square-wave shape.

The condensers 89 and their corresponding resistors 84 do not need to be of identical capacities so that it is possible to have the tubes conduct for different periods of time which periods are adjustable by changes in their capacitors and resistors. The square-wave shape insures continued energization of one or the other of the windings 87 of the differential relay so that the armature is held either against one contact or the other and the lights are alternately lighted without any noticeable interval between the two. The frequency of oscillation of the circuit can be determined approximately from the following equation:

$$f = \frac{1}{R_1C_1 + R_2C_2}$$

where $R_1$ and $R_2$ are the resistances respectively of the resistors 84 and $C_1$ and $C_2$ are the capacities respectively of the condensers 89.

It will be obvious that the circuit of Figure 5 may be modified by the direct application of high voltage direct current from a suitable source and that the heaters may be energized from any desired source. Furthermore, the tubes may be of the shield grid type if desired, without departing from the operation of the circuit as described above.

In some cases, particularly in connection with the primary and secondary lights on commercial airplanes, a short interval of non-illumination is required between the lighting of the secondary lights and that of the primary lights. This may be obtained without further increase in the number of electronic tubes over those in the circuits of Figures 1 and 2 by the expedient of using a slow acting relay.

One method of obtaining this result is illustrated in Figure 6. The basic circuit illustrated in this figure is substantially identical with that disclosed in Figure 2, and its arrangement and operation will not be further discussed here except to point out the slight variations and additions to the showing in Figure 2. In this figure the source of direct current 310 is under the control of a manual switch 311 for the operation of the vibrator-transformer system already described. A jumper 312 provides for connection of the minus side of the direct current line to A. C. conductor 313. A separate direct current conductor 314 provides for the positive side of this line. These two conductors are arranged to provide the source of power for the primary lights 315 and the secondary lights 316 by way of branch negative conductor 320 and other elements about to be discussed.

The dual relay 324 is similar to the one shown in Figure 2 except that the upper spring 325 engages only one contact. It is arranged to be closed at the same time that the lower spring is closed and is normally held open in the manner previously explained. The plus conductor 314 is connected to the upper spring 325. The contact 326 engageable by spring 325 is connected by conductor 328 to the opposite sides of the secondary light 316 so that this light is always lighted when the relay 324 is closed. It will be recalled that the time interval for lighting the secondary light is determined by the capacity of condenser C2 and the rate at which it discharges through its resistor R2 determines the time in which relay 324 remains closed.

The primary lights receive their current from the positive conductor 314 through the contacts 330 of relay 331 of the slow release type. The winding of this relay is arranged to be connected in parallel to or for energization in unison with the secondary lights so that the contacts 330 are open when the secondary lights are lighted insuring against both sets of lights being illuminated at the same time. When the contacts of dual relay 324 are open the secondary lights are extinguished and the primary lights are energized through the relay contacts 330, but on deenergization of the winding 331 a delay occurs before release of the relay armature and hence it cannot move up to close contacts 330 and illuminate the primary lights until this delay interval has expired. For the purpose of airplane illumination the interval is approximately 0.2 second. It is to be noted that this interval occurs between the lighting of the secondary lights and the lighting of the primary lights. The relay, however, being slow acting only on release provides no interval between the lighting of the primary lights and that of the secondary lights as is desired.

It is further to be noted that the delay occasioned by the release of relay 331 acts during the interval in which condenser C1 is discharging to determine the time elapsed during the illumination of the primary lights. This condenser therefore must be adjusted to provide the additional 0.2 second time when all illumination is extinguished.

Obviously various other modifications involving the use of slow acting relays may be arranged to provide desired intervals in any part of the cycle. Furthermore, the relay circuits just described may be similarly combined with the delay circuits of any of the other figures of the drawing in an obvious manner.

I claim:

1. An electronic cycling and timing circuit comprising an electron tube having a cathode, anode and grid, a source of current supply, a condenser-resistor shunt circuit having one terminal connected to said grid and the other to one side of said source, a cathode-anode circuit having impedance elements, the other side of said supply being connected to a point between said elements whereby said condenser is charged through the grid-cathode circuit to provide a blocking bias for said tube, a normally closed switch adapted when closed to connect the first side of said source directly to said cathode whereby the tube fires after said condenser discharges to the "threshold" bias potential, and means to periodically and momentarily open said switch to charge said condenser and restart the condenser discharge timing.

2. An electronic cycling and timing circuit comprising an electron tube having a cathode, anode and grid, a source of current supply, a condenser-resistor shunt circuit having one terminal connected to said grid and the other to one side of said source, a cathode-anode circuit having impedance elements, the other side of said supply being connected to a point between said elements whereby said condenser is charged through the grid-cathode circuit to provide a blocking bias for said tube, a normally open switch adapted when closed to connect the first side of said source directly to said cathode whereby the tube fires after said condenser discharges to the "threshold" bias potential, and means to periodically close said switch.

3. An electronic cycling and timing circuit comprising an electron tube having a cathode, anode and grid, a source of current supply, a condenser-resistor shunt circuit having one terminal connected to said grid and the other to one side of said source, a cathode-anode circuit having impedance elements, the other side of said supply being connected to a point between said elements whereby said condenser is charged through the grid-cathode circuit to provide a blocking bias for said tube, a normally closed switch adapted when closed to connect the first side of said source directly to said cathode whereby the tube fires after said condenser discharges to the "threshold" bias potential, and means dependent on condenser discharge timing to periodically and momentarily open said switch to charge said condenser and restart the condenser-resistor shunt circuit discharge timing.

4. An electronic cycling and timing circuit comprising an electron tube having a cathode, anode and grid, a source of current supply, a condenser-resistor shunt circuit having one terminal connected to said grid and the other to one side of said source, a cathode-anode circuit having impedance elements, the other side of said supply being connected to a point between said elements whereby said condenser is charged through the grid-cathode circuit to provide a blocking bias for said tubes, a normally open switch adapted when closed to connect the first side of said source directly to said cathode whereby the tube fires after said condenser discharges to the "threshold" bias potential, and a self-timing circuit arranged to periodically close said switch to start the timing operation.

5. An electronic cycling and timing circuit comprising an electron tube having a cathode, anode and grid, a source of current supply, a condenser-resistor shunt circuit having one terminal connected to said grid and the other to one side of said source, a cathode-anode circuit having impedance elements, the other side of said supply being connected to a point between said elements whereby said condenser is charged through the grid-cathode circuit to provide a blocking bias for said tube, a normally closed switch adapted when closed to connect the first side of said source directly to said cathode whereby the tube fires after said condenser discharges to the "threshold" bias potential, magnetic means to periodically and momentarily open said switch to charge said condenser and restart the condenser-resistor shunt circuit discharge timing, and an electron tube circuit adapted to supply current for the energization of said magnetic means.

6. An electronic cycling and timing circuit comprising an electron tube having a cathode, anode and grid, a source of current supply, a condenser-resistor shunt circuit having one terminal connected to said grid and the other to one side of said source, a cathode-anode circuit having impedance elements, the other side of said supply being connected to a point between said elements whereby said condenser is charged through the grid-cathode circuit to provide a blocking bias for said tube, a switch adapted to transfer the cathode to the grid side of said source whereby the tube fires after said condenser discharges to the "threshold" bias potential, and means comprising a duplicate of the aforementioned circuit to periodically actuate said switch.

7. An electronic cycling and timing circuit comprising a pair of electron tubes each having a cathode, anode and grid, a source of current supply, a pair of condenser-resistor shunt circuits each having one terminal connected to one of said grids and the other to one side of said source, a cathode-anode circuit for each tube and having impedance elements, the other side of said supply being connected to a point between said elements in each cathode-anode circuit, whereby said condensers are charged through the grid-cathode circuit of their respective tubes to each provide a blocking bias for its tube, a pair of switches each adapted to connect the first side of said source directly to the cathode of its associated tube whereby that tube fires after its condenser discharges to the "threshold" bias potential, each of said switches having an operating magnet in the circuit of the other tube.

8. An electronic cycling and timing circuit comprising a pair of gas-filled electron tubes each having a cathode, anode and grid, a source of current supply, a pair of condenser-resistor shunt circuits each having one terminal connected to one of said grids and the other to one side of said source, a cathode-anode circuit for each tube and having two impedance elements, the other side of said supply being connected to the point between said elements in each cathode anode circuit whereby said condensers may be charged through the grid-cathode circuit of their respective tubes to provide a blocking bias for its tube, a pair of switches each adapted to connect the first side of said source directly to the cathode of its associated tube whereby that tube fires after its condenser discharges to the "threshold" bias potential, and magnetic means to actuate said switches energized each from the anode-cathode circuit of the other tube.

9. The circuit as claimed in claim 8 in which the winding of each of said magnetic means is one of said impedance elements.

10. An electronic cycling and timing circuit comprising a pair of gas-filled electron tubes each having a cathode, anode and grid, a source of current supply, a pair of condenser-resistor shunt circuits each having one terminal connected to one of said grids and the other to one side of said source, a cathode-anode circuit for each tube and having two impedance elements, the other side of said supply being connected to the point between said elements in each cathode anode circuit whereby said condensers may be charged through the grid-cathode circuit of their respective tubes to provide a blocking bias for its tube, a pair of switches each adapted to connect the first side of said source directly to the cathode of its associated tube whereby that tube fires after its condenser discharges to the "threshold" bias potential, one of said switches being biased to open position and the other to closed position.

11. An electronic cycling and timing circuit comprising a pair of gas-filled electron tubes each having a cathode, anode and grid, a source of current supply, a pair of condenser-resistor shunt circuits each having one terminal connected to one of said grids and the other to one side of said source, a cathode-anode circuit for each tube and having two impedance elements, the other side of said supply being connected to the point between said elements in each cathode anode circuit whereby said condensers may be charged through the grid-cathode circuit of their respective tubes to provide a blocking bias for its tube, a pair of switches each adapted to connect the first side of said source directly to the cathode of its associated tube whereby that tube fires after its condenser discharges to the "threshold" bias potential, one of said switches being biased to open position, a pair of contacts for a separate circuit arranged to be alternately engaged in accordance with the position of said last mentioned switch and the other switch being biased to closed position.

12. An electronic cycling and timing circuit comprising a plurality of gas-filled electron tubes each having a cathode, anode and grid, a source of current supply, a condenser-resistor shunt circuit for each tube and each having one terminal thereof connected to the grid of its tube and the other terminal to one side of said source, a cathode-anode circuit for each tube having a cathode resistor and a plate reactor, the other side of said supply being connected to each of the points between the said resistor and reactors, a switch for each tube and adapted to connect its cathode directly to the first or grid side of said source, the said plate reactors constituting magnetic windings each adapted to actuate one of said switches associated with another tube.

13. The circuit of claim 12 in which all but one of said switches are biased to open position.

RICHARD H. HAUNGS.

REFERENCES CITED

The following references are of record in the file of this patent:

UNITED STATES PATENTS

| Number | Name | Date |
| --- | --- | --- |
| 1,952,186 | Suits | Mar. 7, 1934 |
| 2,129,747 | Sorensen | Sept. 13, 1938 |
| 2,171,347 | Schneider | Aug. 29, 1939 |
| 2,251,763 | Schoene | Aug. 5, 1941 |
| 2,296,580 | Smiley | Sept. 22, 1942 |
| 2,370,727 | Holden | Mar. 6, 1945 |